United States Patent [19]

Nakamura et al.

[11] Patent Number: 4,743,479
[45] Date of Patent: May 10, 1988

[54] MULTI-LAYERED VESSELS AND METHOD FOR MOLDING THE SAME

[75] Inventors: Yoshinori Nakamura; Hiroyuki Orimoto; Kouichi Sato, all of Sakakimachi, Japan

[73] Assignee: Nissei ASB Machine Co., Ltd., Japan

[21] Appl. No.: 849,556

[22] Filed: Apr. 8, 1986

[30] Foreign Application Priority Data

Apr. 12, 1985 [JP] Japan .................................. 60-78015

[51] Int. Cl.⁴ ............................................. B65D 23/00
[52] U.S. Cl. ...................................... 428/35; 428/213; 215/1 C; 220/453; 264/513
[58] Field of Search ...................... 428/35, 542.8, 213; 215/1 C; 264/512, 513; 220/453

[56] References Cited

U.S. PATENT DOCUMENTS

| | | | |
|---|---|---|---|
| 4,149,645 | 4/1979 | Valyi | 428/35 |
| 4,174,413 | 11/1979 | Yasuike et al. | 428/35 |
| 4,483,891 | 11/1984 | Cerny | 428/35 |
| 4,501,781 | 2/1985 | Kushida et al. | 428/35 |
| 4,526,821 | 7/1985 | McHenry et al. | 428/35 |
| 4,528,219 | 7/1985 | Yamada et al. | 428/35 |
| 4,564,541 | 1/1986 | Taira et al. | 428/35 |

Primary Examiner—John E. Kittle
Assistant Examiner—James J. Seidleck
Attorney, Agent, or Firm—Ostrolenk, Faber, Gerb & Soffen

[57] ABSTRACT

The present invention provides a multi-layered vessel whose sectional construction comprises at least a triple-layer obtained by blow or orientation blow molding an injection molded multi-layered parison, comprising a first resin forming a body, and a second resin having gas barrier properties or heat resistance more than that of the first resin, the second resin being present as an intermediate layer of the body within the first resin, the intermediate layer being smaller in wall thickness than an outer layer of the body and being one-sided toward the outer layer, the first layer being defined into an inner layer and an outer layer by the intermediate layer, the wall thicknesses of the outer layer and the inner layer being in the ratio of outer layer to inner layer, 1:1.50 or more, preferably, in the range of 1:3.50.

4 Claims, 4 Drawing Sheets

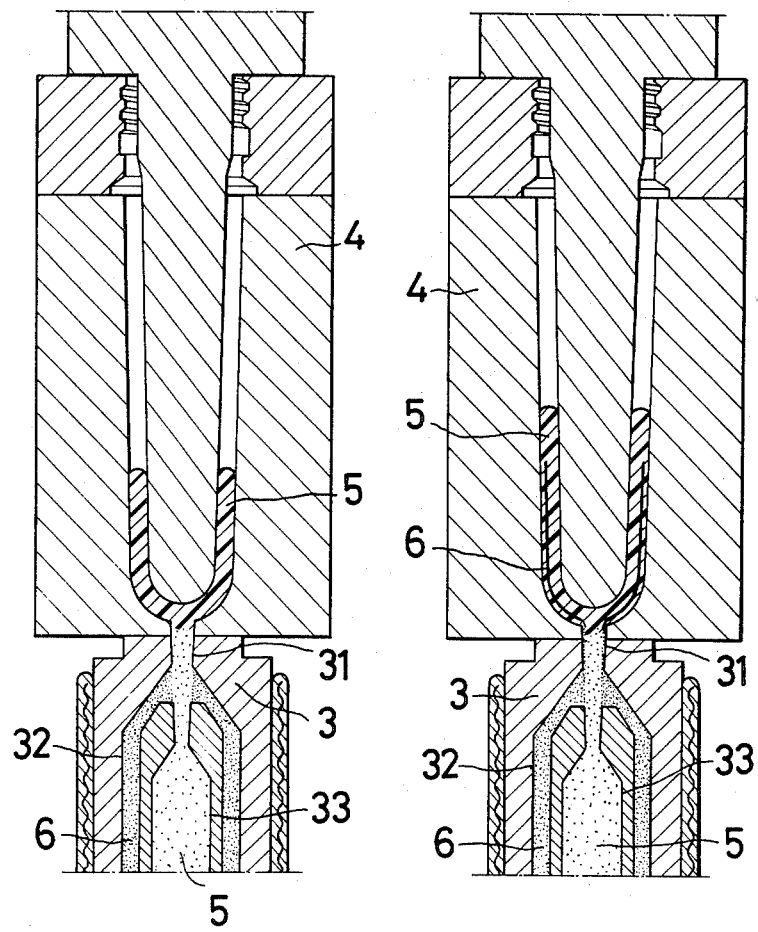

MULTI-LAYERED VESSELS AND METHOD FOR MOLDING THE SAME

BACKGROUND OF THE INVENTION (1) Field of the Invention

This invention relates to a multi-layered vessel whose sectional structure of synthetic resin has at least a triple-layer used as a vessel for containing carbonated beverages or fruit juice.

(2) Description of the Prior Art

Blow or orientation blow molded plastic packing vessels are light in weight and have a falling strength but are inferior in heat resistance and gas barrier properties to glass. In the case where these vessels are used as vessels for beverages which refrain from permeation of fruit juice, oxygen, carbonic acid or the like which require to be filled at high temperature, a further improvement has been necessitated.

In view of the foregoing, a multi-layered vessel of at least a triple-layer has been developed in which within the resin (for example, polyethyleneterephthalate) to be used to form a vessel body is provided, as an intermediate layer, other resin which makes up for the disadvantage of the first-mentioned resin. As other intermediate layers, an ethylene vinyl alcohol copolymer having excellent gas barrier properties, polycarbonate polyamide having a heat resistance and the like are used.

This vessel having a multi-layered construction can be produced by blow molding or orientation blow molding an extruded or injection molded multi-iayered parison in a manner similar to the case of a single-layer construction, and an intermediate layer formed therein is positioned in the midst or internally of the resin which forms a vessel body. In the vessel body in which the intermediate layer is positioned in the midst of the resin, there is present no difference in wall thickness between two layers, an inner layer and an outer layer, defined by the intermediate layer, but where the intermediate layer is positioned one-sided inwardly, there is present a difference in wall thickness between the inner and outer layers, in which case the inner layer is materially thin as compared with that of the outer layer.

The distribution of the wall thickness of layers in the multi-layered vessel is decided by the distribution of the wall thickness of a multi-layered bottom parison extruded or injection molded, and a proportion of the wall thickness of the parison will be a proportion of the wall thickness of a vessel without modification.

Molding of a multi-layered bottomed parison is effected by using a double nozzle composed of an outer flowpassage in communication with a nozzle orifice and an inner flowpassage opened in an extreme end of the outer flowpassage, as disclosed in U.S. Pat. No. 4,174,413, and a first resin forming a parison body and a second resin forming an intermediate layer are injected into a cavity through the outer flowpassage and inner flowpassage, respectively. While the wall thickness of the intermediate layer can be varied by the quantity of injection of the two resins, the intermediate layer is always one-sided inwardly, as a consequence of which the inner layer is formed into a thin layer.

The resins such as ethylene vinyl alcohol copolymer (EVOH), polyamide (FA) and the like increase in the quantity of permeation of oxygen, carbonic acid or the like as the moisture absorption increases. On the other hand, the biaxially oriented polyester resin used as bottles for carbonated beverages is lower in water vapor permeability than the aforementioned resin but the water vapor permeability is affected by the thickness as can be said generally in resins.

Therefore, in a multi-layered vessel in which an inner layer is formed in a small wall thickness, even if the resin forming a vessel is biaxially oriented polyethyleneterete, the gas barrier properties caused by the intermediate layer is materially decreased by the influence of the moisture absorption from the content, and the permeability of oxygen and carbonic acid increases. Therefore, such vessels are not suitable for use with beer, carbonated beverages and the like which are required to be stored for a long period of time, and in order to use such vessels as ones for food and drinks which refrain from permeation of oxygen, even a multi-layered vessels have to further increase its gas barrier properties.

Similarly, in order to enhance the heat resistance, even if a second resin as an intermediate layer comprising a resin having the heat resistance is injected, it is not favorable to make the wall thickness of the inner layer thin, and the inner layer is formed to be as thick as possible. However, so far a triple-layered heat resisting vessel in which an inner layer has a greater wall thickness than that of an outer layer has not been available.

OBJECT OF THE INVENTION

This invention has been accomplished in order to solve these problems as noted above with respect to the multi-layered vessels. An object of the invention is to provide a new multi-layered vessel or a multi-layered vessel having an excellent heat resistance, which is greater in wall thickness of an inner layer than the prior art construction, is further reduced in permeation of oxygen and permeation of carbonic acid, can maintain gas barrier properties for a long period of time, and can maintain the gas barrier properties even under the state of relatively high temperature, while using similar resins to those of conventional multi-layered vessels.

A further object of the present invention is to provide a new molding method which comprises injection molding a multi-layered parison, which is capable of molding a multi-layered vessel wherein an inner layer is formed to have a greater thickness than an outer layer by an intermediate layer, by use of a double nozzle, and obtaining a multi-layered vessel having an excellent gas barrier properties or heat resistance from said multi-layered parison.

Accordingly, the present invention provides a multi-layered vessel and a method for molding the same, which vessel comprises a first resin forming a body and a second resin which has greater gas barrier properties or heat resistance than that of the first resin and which is present as an intermediate layer of the body within the first resin, said body being provided with at least three layers, i.e., said intermediate layer, an inner layer and an outer layer which are defined by said intermediate layer, said inner layer being formed to be materially greater in wall thickness than that of the outer layer by the provision of the intermediate layer formed one-sided toward the outer layer, and in case the second resin has the gas barrier properties, the influence of temperature from the interior of the body to the intermediate layer is reduced by the wall thickness of the inner layer whereas in case the second resin has the heat resistance, the vessel may withstand high temperatures during filling by the presence of the wall thickness of the inner layer and the intermediate layer.

BRIEF DESCRIPTION OF THE DRAWINGS

FIGS. 3 to 5 are respectively sectional views of a nozzle portion and a mold showing the molding method of the present invention in order:

FIG. 3 is a view showing a state wherein a first resin forming a body of a multi-layered parison is partly injected;

FIG. 4A is a sectional view of a nozzle tip portion and a gate portion showing a state wherein a second resin forming an intermediate layer is injected into the resin forming the body;

FIG. 5 is a view showing a state wherein molding of a multi-layered parison has been completed.

DETAILED DESCRIPTION OF THE INVENTION

Figure 1:
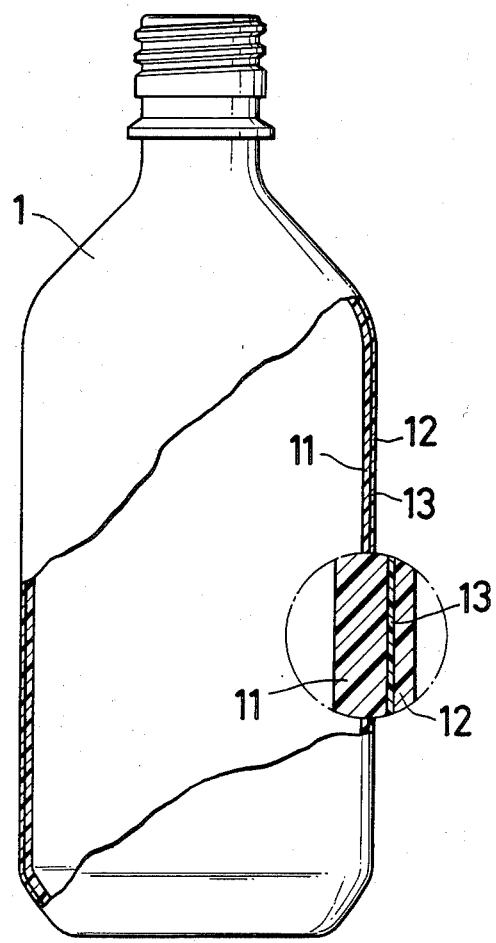
FIG. 1 is a partly enlarged fragmentary sectional view of a multi-layered vessel molded from a multi-layered parison molded according to the present invention.
Figure 2:
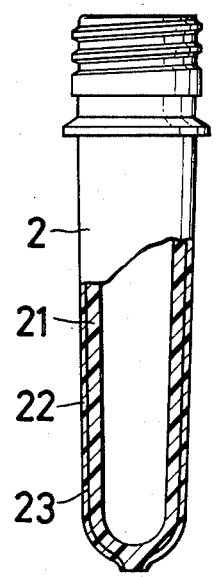
FIG. 2 is a sectional view of a multi-layered parison molded according to the present invention.

FIG. 1 shows a multi-layered vessel 1 in the form of a bottle whose entirety has a triple-layered construction, in which an inner layer 11 and an outer layer 12 are formed from the same thermoplastic resin, and an intermediate layer 13 is formed from a thermoplastic resin having excellent gas barrier properties.

The intermediate layer 13 is provided one-sided toward the outer layer 12 whereby a wall thickness of the inner layer 11 is materially greater than that of the outer layer 12.

The ratio of wall thickness between the inner layer 11 and the outer layer 12 is preferably above 1.50:1, and the greater the wall thickness of the inner layer, the gas barrier properties are enhanced.

The aforesaid multi-layered vessel 1 can be produced by blow or orientation blow molding a multi-layered parison 2 having a triple-layered construction in which a resin forming a parison body is defined into an inner layer 21 and an outer layer 22 which are different in wall thickness from each other by an intermediate layer 23 formed from the other resin into the first-mentioned resin.

This multi-layered parison 2 is injection molded by use of a double nozzle shown in FIG. 3 and others, that is, a double nozzle 3 coaxially provided with an outer flowpassage 32 in communication with a nozzle orifice 31 and an inner flowpassage 33 opened into the extreme end of the outer flowpassage 32.

In molding a multi-layered parison by use of a conventional double nozzle, a first resin forming a parison is injected from the outer flowpassage 32 into a mold 4 but in the present invention, a first resin 5 is injected from the inner flowpassage 33 and a resin 6 forming an intermediate layer is injected from the outer flowpassage 32. It is preferable that injection pressure of the resin 6 should be within such an extent that allows the first resin 5 to remain in the nozzle orifice 31 as a core.

Injection of the resin into the mold 4 is begun by injecting a suitable quantity of first resin 5 from the inner flowpassage 33. In this case, injection pressure is approximately 65 kg/cm$^2$ in case of polyethyleneterephthalate (hereinafter referred to as "PET"), and injection is carried out for about 3.5 sec., after which the injection is once stopped, and a second resin 6 is injected from the outer flowpassage 32 under the injection pressure of 90 kg/cm$^2$ for 0.1 to 1.0 sec.

The second resin 6, which is injected with the injection of the first resin 5 stopped, is to be one-sided externally of a cavity filled with the first resin 5, as shown in FIG. 4A.

Figure 4B:
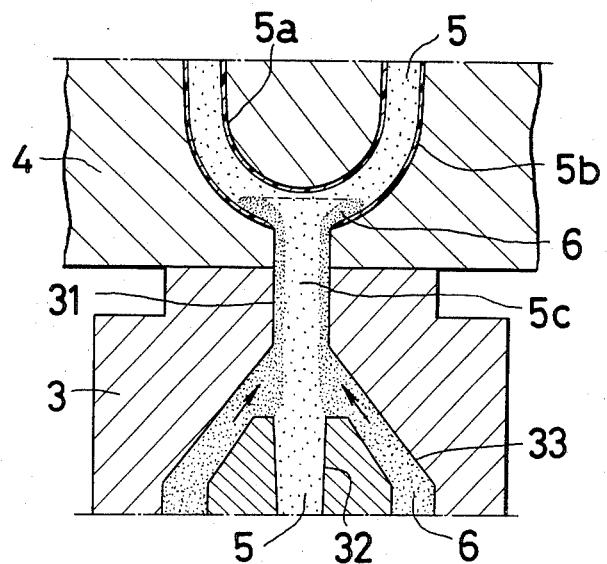
FIG. 4B is a sectional view of a nozzle tip portion and a gate portion showing a state wherein the second resin is injected.

This results from the fact that as shown in FIG. 4B, a part of the previously injected first resin 5 forms skin layers 5a and 5b by cooling caused by the mold 4, and the other part thereof remains in the form of a core 5c in the nozzle orifice 31 from the inner flowpassage 33, the core 5c causing the resin to prevent it from entry into the central portion of the first resin 5 from the center of the nozzle orifice 31 and to pass through the nozzle orifice 31 in a manner so as to spread open the periphery of the core 5c.

Figure 4C:
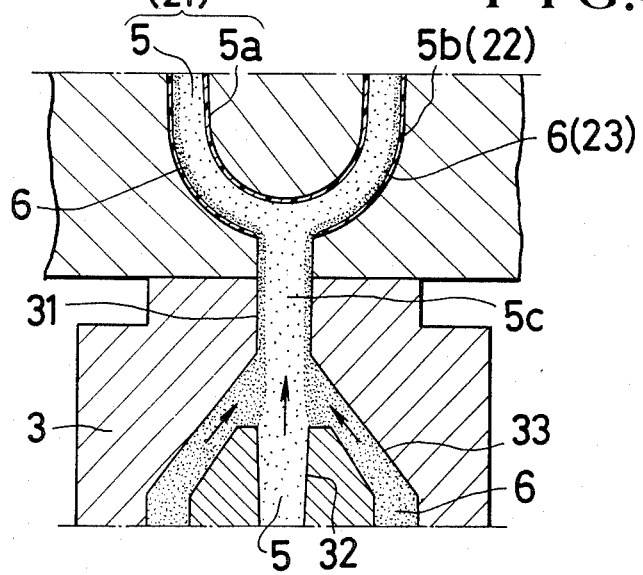
FIG. 4C is a sectional view of a nozzle tip portion and a gate portion showing a state wherein the first resin and second resin are simultaneously injected.
Figure 5:
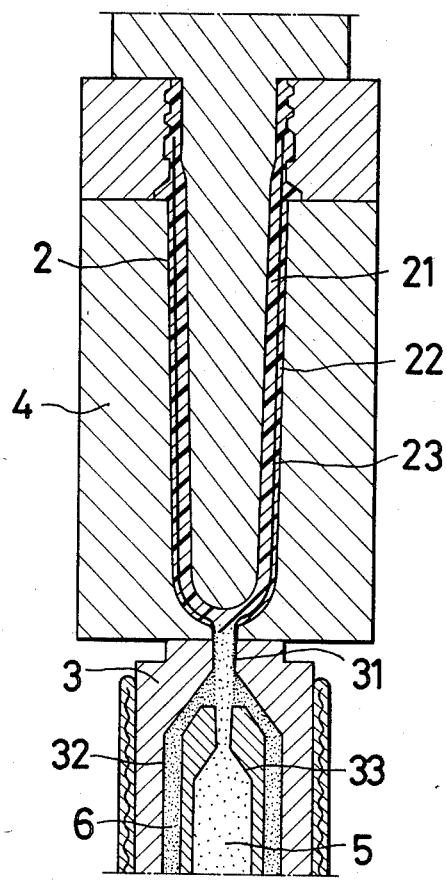

After the lapse of injection time, injection of the first resin 5 is again carried out with the injection of the second resin 6 kept to proceed. The injection time of the second resin 6 is about 1.6 sec. and the injection time of the first resin 5 after re-injection is about 3.4 sec., and the two resins forwardly flow between the skin layers 5a and 5b of the first resin 5 by cooling as shown in FIG. 4C. Thereby the outer skin layer 5b is moved away from the flowing first resin 5 by the second resin 5 and is formed into the outer layer 22 without increasing its thickness. The inner skin layer 5a is molten together with the first ressin 5 injected along with the second resin 6 to increase a thickness thereof, where the thick inner layer 21 is formed. As the result, finally, as shown in FIG. 5, a multi-layered parison 2 having a triple-layered construction in which the intermediate layer 23 is positioned one-sided toward the outer layer 22 is formed.

The aforementioned step of injection molding uses an ethylene vinyl alcohol copolymer as the second resin 6. In case where the intermediate layer 23 is formed from polyamide which contains a methoxylene group, the second resin 6 is injected alone after the parison forming resin 5, after which the first resin 5 can be further injected alone or the second resin 6 can be injected while injecting the first resin 5.

However, whatever the injection timing of the second resin 2 may be, as far as the first resin 5 is first injected from the inner flowpassage 33 and the second resin 6 is then injected from the outer flowpassage 32, it is possible to mold the multi-layered parison 2 in which the inner layer 21 is partitioned to have a materially greater wall thickness than that of the outer layer 22 by the intermediate layer 23 formed from the second resin 6.

When the amount of injetion of the second resin 6 decreases, the wall thickness of the intermediate layer 23 also naturally decreases but there is no significant change in the wall thickness of the outer layer 22 and the wall thickness of the inner layer 21 increases.

Accordingly, the wall thicknesses of the inner layer 21 and the intermediate layer 22 can be adjusted from each other to enhance the gas barrier and heat resistant properties. As the case may be, the quantity of use of the second resin 6 which is generally considered to be expensive as compared with the first resin 5 can be reduced to lower the cost.

Next, gas barrier effects of a biaxially oriented triple-layered vessel produced by orientation blow molding the above-described multi-layered bottomed parison 2 in a conventional manner are given below:

EMBODIMENT AND COMPARATIVE EXAMPLE

| Kind of vessel: | Bottle with a round bottom for carbonated beverage, 0.7 lit., 26 g |
|---|---|
| First resin: | PET: TEIJIN TR-8550 |
| Second resin: | PA: MXD-6 nylon |
| Second resin: | EVOH: KURARE EVERL E-105 |
| Machine used: | ASB-50HT 107 (manufactured by NISSEI ASB) |
| Injection capacity: | First resin side: 3.50 oz (038 screw) Second resin side: 1.0 oz (019 screw) |
| Coefficient of permeation for oxygen and carbonic gas (per bottle): | cc/2 kg, 24 hours, 1 atmosphere |
| Oxygen permeation measuring unit: | MOCON, two-through gas permeation measuring unit |
| Carbonic gas permeation measuring unit: | MOCON, five-through gas permeation measuring unit (a 4-volume calcareous water filled vessel is measured) |
| Measuring conditions: | Relative humidity: inside - 100% RH, outside: 65% RH, Room temp. 24° C. one week remains left |

EMBODIMENTS 1, 2 AND COMPARATIVE EXAMPLE 1

Structure of vessel: Outer layer/intermediate layer/inner layer
PET/PA/PET

| | Emb. 1 | Emb. 2 | Comp. Exa. 1 |
|---|---|---|---|
| Wall thickness of a shell of vessel (μ) | | | |
| Outer layer | 80 | 59 | 182 |
| Intermediate layer | 38 | 39 | 41 |
| Inner layer | 143 | 170 | 53 |
| Whole body | 261 | 268 | 276 |
| Ratio of outer layer/inner layer: | 1/1.8 | 1/2.9 | 3.4/1 |
| Coefficient of oxygen permeation | 0.110 | 0.092 | 0.136 |
| Coefficient of carbonic acid permeation | — | — | — |

EMBODIMENTS 3, 4 AND COMPARATIVE EXAMPLE 2

Structure of vessel: Outer layer/intermediate layer/inner layer
PET/EVOH/PET

| | Emb. 3 | Emb. 4 | Comp. Exa. 2 |
|---|---|---|---|
| Wall thickness of shell of vessel (μ) | | | |
| Outer layer | 76 | 60 | 188 |
| Intermediate layer | 15 | 16 | 16 |
| Inner layer | 174 | 194 | 52 |
| Whole body | 265 | 270 | 261 |
| Ratio of outer layer/inner layer | 1/2.3 | 1/3.2 | 3.6/1 |
| Coefficient of oxygen permeation | 0.111 | 0.099 | 0.207 |
| Coefficient of carbonic acid permeation | 0.447 | 0.398 | 0.803 |

As will be evident from the above-described Embodiments and Comparative Examples, the gas barrier effect according to the present invention in which the inner layer is formed to have a greater thickness than that of the outer layer has been enhanced much more than that of the conventional construction in which the outer layer has a greater thickness.

Moreover, it is to be noted that if a heat resisting multi-layered vessel uses, as an intermediate layer, the heat resistant resin such as polycarbonate, polyarylate polyethyleneterephthalate (U-POLYMER) or the like, the vessel having the inner layer greater in wall thickness is excellent in heat resistance, which induces no thermal deformation even at a temperature up to 85° C.

What is claimed is:

1. A multi-layered vessel, comprising:
   a vessel body defined by a peripheral wall which forms the vessel, the peripheral wall comprising at least three superposed wall layers and including at least an inner wall layer, an outer wall layer and an intermediate layer disposed between the inner and outer wall layers, the vessel body being formed by blow or orientation blow molding from an injection molded multi-layered parison, the inner and outer wall layers comprising a first resin and the intermediate layer comprising a second different resin having substantially improved gas barrier or heat resisting characteristics as compared to the first resin, the second resin being flowed into the first resin to separate the first resin and to form it into the inner and outer wall layers, the wall thickness of the intermediate layer being smaller than the outer wall layer and the wall thickness ratio of the inner wall layer to the outer wall layer being greater than 2.3:1.

2. The multi-layered vessel as set forth in claim 1, wherein the first resin comprises polyethyleneterephthalate, and the second resin comprises an ethylene vinyl alcohol copolymer.

3. The multi-layered vessel as set forth in claim 1, wherein the first resin comprises polyethyleneterephthalate, and the second resin comprises a polyarylate polyethylene terephthalate resin or polycarbonate.

4. The multi-layered vessel as set forth in claim 1, in which the wall thickness ratio is about 3.5:1.

* * * * *